United States Patent [19]
Suggs

[11] Patent Number: 5,923,186
[45] Date of Patent: Jul. 13, 1999

[54] TWO STATE BI-DIRECTIONAL BUS

[75] Inventor: David N. Suggs, Austin, Tex.

[73] Assignee: Advanced Micro Devices, Inc., Sunnyvale, Calif.

[21] Appl. No.: 08/823,032

[22] Filed: Mar. 21, 1997

[51] Int. Cl.$^6$ .............................................. H03K 19/0175
[52] U.S. Cl. .............................. 326/82; 326/16; 326/86; 326/90
[58] Field of Search .................. 326/16, 21, 82, 326/86, 90, 104

[56] References Cited

U.S. PATENT DOCUMENTS

| | | | |
|---|---|---|---|
| 4,417,162 | 11/1983 | Keller et al. | |
| 4,621,202 | 11/1986 | Pumo. | |
| 4,982,115 | 1/1991 | Lee | 326/86 |
| 5,214,330 | 5/1993 | Okazaki | 326/90 |
| 5,373,514 | 12/1994 | Ma | 371/57.1 |
| 5,418,933 | 5/1995 | Kimura et al. | 395/550 |
| 5,594,370 | 1/1997 | Nguyen et al. | 326/86 |

FOREIGN PATENT DOCUMENTS

| | | | |
|---|---|---|---|
| 54-43641 | 6/1979 | Japan | 326/86 |
| 62-287711 | 12/1987 | Japan | 326/90 |

*Primary Examiner*—Jon Santamauro
*Attorney, Agent, or Firm*—Skjerven, Morrill, MacPherson, Franklin & Friel L.L.P.

[57] ABSTRACT

The present invention discloses a bi-directional bus system including one or more junction circuits and a plurality of logic blocks wherein each logic block includes circuitry for transmitting and receiving data and a driver circuit for selectively driving an idle state or data signals as output signals. A bi-directional bus segment for conducting data signals thereon couples a logic block or a junction circuit to another junction circuit. The output signal to each bi-directional bus segment coupled to a junction circuit is a function of the input signals from all the other bi-directional bus segments coupled to the junction circuit and is controlled by one input signal not being driven into the idle state when all the other input signals are driven into the idle state. The bi-directional bus segment coupled to each logic block directly provides input signals to the logic block.

36 Claims, 7 Drawing Sheets

TWO STATE BI-DIRECTIONAL BUS

BACKGROUND OF THE INVENTION

1. Field of the Invention

This invention relates in general to data bus systems, and more particularly to bi-directional data bus circuits using two-state logic.

2. Description of the Related Art

Digital electronics are circuits in which there are usually only two states possible at any point, usually referred to as a HIGH level voltage (a logic 1) or a LOW level voltage (a logic 0).

Normally, a logic circuit will not operate correctly if the outputs of two or more gates or flip-flops are directly connected to each other. For example, if one gate has a LOW and another has a HIGH, when the gate outputs are connected together the resulting output voltage may be some intermediate value that does not clearly represent either a LOW or a HIGH. In some cases, damage to the gates may result if the outputs are connected together. What is needed is a gate whose output can be "open". Use of three-state logic will permit the outputs of two or more gates or flip-flops to be connected together.

Three-state logic, also called Tri-state logic (a trademark of National Semiconductor Corporation) is a gate with a third output state: open circuit. A separate enable input determines whether the output behaves like an ordinary active two-state output or goes into the "third" (open) state, regardless of the logic levels present at the other inputs. A device with three-state output behaves exactly like ordinary active two-state logic when enabled, always driving its output either HIGH or LOW; when disabled, it effectively disconnects its output, so another logic device can drive the same line. Three-state drivers are widely used to drive computer data buses which are, for example, a single set of eight or sixteen wires accessible to several devices. Every device (memory, peripherals, etc.) that needs to put data on the shared bus ties onto it with three-state gates. The network is arranged so that at most one device has its drivers enabled at any instant, all other drivers being disabled into the open (third) state. However, there must be some external logic to make sure that three-state devices sharing the same output lines don't try to drive the lines at the same time (which produces an undesirable condition called "bus contention").

As shown in FIG. 1A, labeled prior art, three-state element 100 has two input lines 105 and 110, data input line 105, and control or enable input line 110, and one output line 115. Data input line 105 provides a data input signal to the three-state element 100 with either a logic value of 0 or 1. When the enable signal on control input line 110 is active, the logic level of the data input signal is transferred through element 100 to output line 115. When the enable signal on control input line 110 is inactive, output line 115 is at a high impedance state. Thus the output signal from the three-state element 100 can be in one of three states, logic 0, logic 1, or high impedance.

In a digital circuit, three-state elements are often used to construct three state buses such as bus 120 illustrated in FIG. 1B and labeled prior art. Three-state elements 100-1, 100-2, . . . 100-n have data input lines 105-1, 105-2, . . . 105-n, respectively, that carry corresponding data input signals. Control input lines 110-1, 110-2, . . . 110-n carry an enable signal to three-state elements 100-1, 100-2, . . . 100-n, respectively. In the digital circuit, only one data input signal is selected or enabled and appears on output line 125 as a bus output signal. There are at least two possible states of bus 120 which are undesirable. In the first state, two or more control input signals are active or enabled and as a result a contention occurs on bus 120 between the output signals from the active three-state elements. In the second state, all control input signals are inactive so that bus 120 floats at a high impedance state. Both of these states are typically unacceptable in a digital circuit.

With the development of large systems today, it is becoming increasingly important to design into logic systems efficient procedures for diagnosing faults. A design for a digital circuit is typically tested by applying a sequence of known test vectors to the design using a computer based system. A test vector typically defines all the input signals to the circuit and the expected output signals for the given input signals. The main purpose of the test vectors is to help the designer verify that the design has been correctly manufactured. However, a test pattern generator in a computer based design system does not have a means for determining whether a given test vector results in either contention or floating of a three-state bus. Typically, a computer based test generation system, and therefore the test pattern generator, support a set of primitive logic elements such as AND, OR, NAND, NOR, and NOT.

Therefore, a system is needed for use in, for example, computer system data buses, that provide the benefits and functions of three-state element data buses without the problems of bus contention and floating that occur with three-state elements and also provides a more efficient and viable circuit system for circuit scan testing of the design.

SUMMARY OF THE INVENTION

The present invention discloses a bi-directional bus system including one or more junction circuits and a plurality of logic blocks wherein each logic block includes circuitry for transmitting and receiving data and a driver circuit for selectively driving an idle state or data signals as output signals. A bi-directional bus segment for conducting data signals thereon couples a logic block or a junction circuit to another junction circuit. The output signal to each bi-directional bus segment coupled to ajunction circuit is a function of the input signals from all the other bi-directional bus segments coupled to the junction circuit and is controlled by one input signal not being driven into the idle state when all the other input signals are driven into the idle state. The bi-directional bus segment coupled to each logic block directly provides input signals to the logic block.

In a first embodiment of the present invention, each junction circuit includes at least three logical AND gates wherein the output signal to each bi-directional bus segment coupled to the junction circuit is the logical AND of the input signals from all the other bi-directional bus segments coupled to the junction circuit and is equal to the input signal that is not being driven into the idle state. The idle state input signals to each junction circuit in the first embodiment are high (logic 1). Each logic block further includes a driver circuit for providing output logic signals to the bi-directional bus segment coupled to the logic block. In this first embodiment of the present invention, the driver circuit includes at least one logical OR gate wherein the output signals of the driver circuit are the logical OR of an inverted enable signal and corresponding logic block output signals and wherein, when the enable signal is high, the output signals of the driver circuit are equal to the corresponding logic block output signals.

In a second embodiment of the present invention, each junction circuit includes at least three logical OR gates wherein the output signals to each bi-directional bus segment coupled to the junction circuit is the logical OR of the input signals from all the other bi-directional bus segments coupled to the junction circuit and is equal to the input signal that is not being driven into the idle state. The idle state input signals to each junction circuit in the second embodiment are low (logic 0). Each logic block further includes a driver circuit for providing output signals to the bi-directional bus segment coupled to the logic block wherein the driver circuit includes at least one logical AND gate wherein the output signals of the driver circuit are the logical AND of an enable signal and corresponding logic block output signals and wherein, when the enable signal is high, the output signals of the driver circuit are equal to the corresponding logic block output signals.

In third and fourth embodiments of the present invention, at least one junction circuit is an inverted input junction circuit and at least one junction circuit is an inverted output junction circuit. The inverted input and output junction circuits are alternated when the junction circuits are coupled together, for example, the inverted output junction circuit provides input signals to the inverted input junction circuit or, alternatively, the inverted input junction circuit provides input signals to the inverted output junction circuit.

In the third embodiment, the idle state input signals to the inverted input junction circuits are low (logic 0). The inverted input junction circuits include logical NOR gates wherein the output to each bi-directional bus segment coupled to each inverted input junction circuit is the logical NOR of the inputs from all the other bi-directional bus segments coupled to the inverted input junction circuit and is equal to the complement of the input signal that is not being driven into the idle state. The idle state input signals to the inverted output junction circuits are high (logic 1) and the inverted output junction circuits include logical NAND gates. The output to each bi-directional bus segment coupled to each inverted output junction circuit is the logical NAND of the inputs from all the other bi-directional bus segments coupled to the inverted output junction circuit and is equal to the complement of the input signal that is not being driven into the idle state. The driver circuit of each logic block coupled to an inverted input junction circuit is an inverted output driver circuit and the driver circuit of each logic block coupled to an inverted output junction circuit is an inverted input driver circuit.

In the fourth embodiment, the idle state input signals to the inverted input junction circuits are high (logic 1). The inverted input junction circuits include logical NAND gates wherein the output to each bi-directional bus segment coupled to each inverted input junction circuit is the logical NAND of the inputs from all the other bi-directional bus segments coupled to the inverted input junction circuit and is equal to the complement of the input signal that is not being driven into the idle state. The idle state input signals to the inverted output junction circuits are low (logic 0) and the inverted output junction circuits include logical NOR gates. The output to each bi-directional bus segment coupled to each inverted output junction circuit is the logical NOR of the inputs from all the other bi-directional bus segments coupled to the inverted output junction circuit and is equal to the complement of the input signal that is not being driven into the idle state. The driver circuit of each logic block coupled to an inverted input junction circuit is an inverted output driver circuit and the driver circuit of each logic block coupled to an inverted output junction circuit is an inverted input driver circuit.

The two-state bi-directional bus system of the present invention provides the same functions and benefits as a three-state bus without the problems of bus contention and floating and also providing a more efficient and viable circuit system for scan testing of the circuit designs.

BRIEF DESCRIPTION OF THE DRAWINGS

The present invention may be better understood, and its numerous objects, features, and advantages made apparent to those skilled in the art by referencing the accompanying drawings.

DESCRIPTION OF THE PREFERRED EMBODIMENT(S)

Figure 1A:
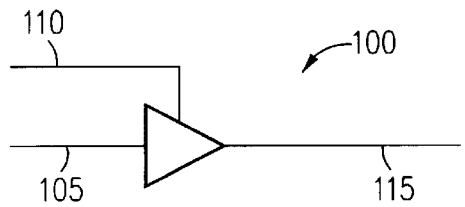
FIGS. 1A and 1B, labeled prior art, illustrate a three-state logic element and a data bus using three-state logic elements.
Figure 1B:
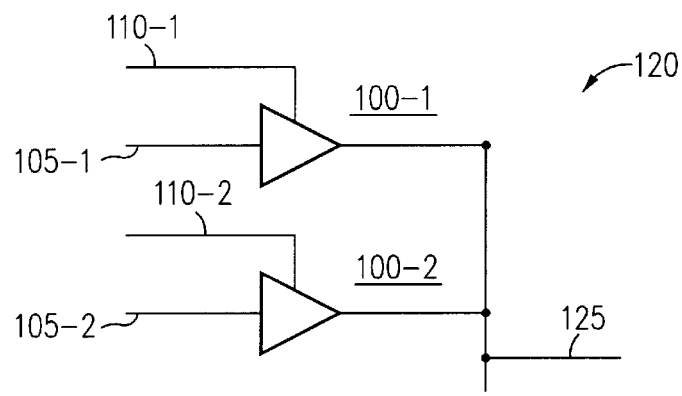
Figure 2:
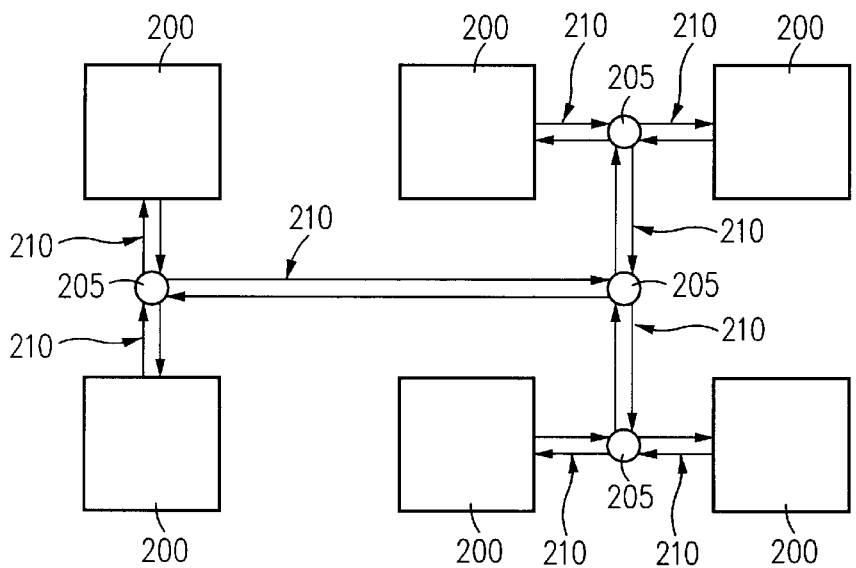
FIG. 2 illustrates the two-state bi-directional bus system of the present invention.

Referring now to FIG. 2, the system diagram illustrates the two-state bi-directional bus system of the present invention. The bi-directional bus system is used, for example, in a semiconductor apparatus, such as a computer system, to transmit or receive data or signals within the computer system. The present invention discloses a plurality of logic blocks 200 (blocks of logic circuitry) wherein each logic block 200 includes circuitry (not shown) for transmitting and receiving data signals and a driver circuit (not shown in this figure, however, illustrated below and discussed in greater detail) for selectively driving output signals to a non-idle or "on" state, or an idle or "off" state. The non-idle state may be a non-idle high (a 1 state) or a non-idle low (a 0 state) as described in the embodiments below. The logic blocks 200 are coupled to one or more junction circuits 205 through a plurality of bi-directional bus segments 210. The output signal to each bi-directional bus segment 210 coupled to a junction circuit 205 is a function of the input signals from all the other bi-directional bus segments 210 coupled to the junction circuit and is controlled by one input signal not being driven into the idle state when all the other input signals are driven into the idle state. For example, generally, all the input signals except one are driven into the idle state and the output signal to the bi-directional bus segments 210 from the junction circuit 205 is controlled by the single remaining input signal, however, when all input signals are in the idle state then the output signal to the bi-directional bus segments 210 from the junction circuit 205 is in the idle state also.

The plurality of bi-directional bus segments 210 are used for transmitting and receiving data signals. The bi-directional bus segments 210 are, for example, a pair of eight or sixteen bussed data wires (one for each data direction). Each bi-directional bus segment 210 couples a logic block 200 or a junction circuit 205 to another junction circuit 205. The use of the junction circuits 205 and the bi-directional bus segments 210 in this data bus system provides the benefits and functions of a three state element data bus without the problems of bus contention because the circuitry uses only two-state elements.

Figure 3A:
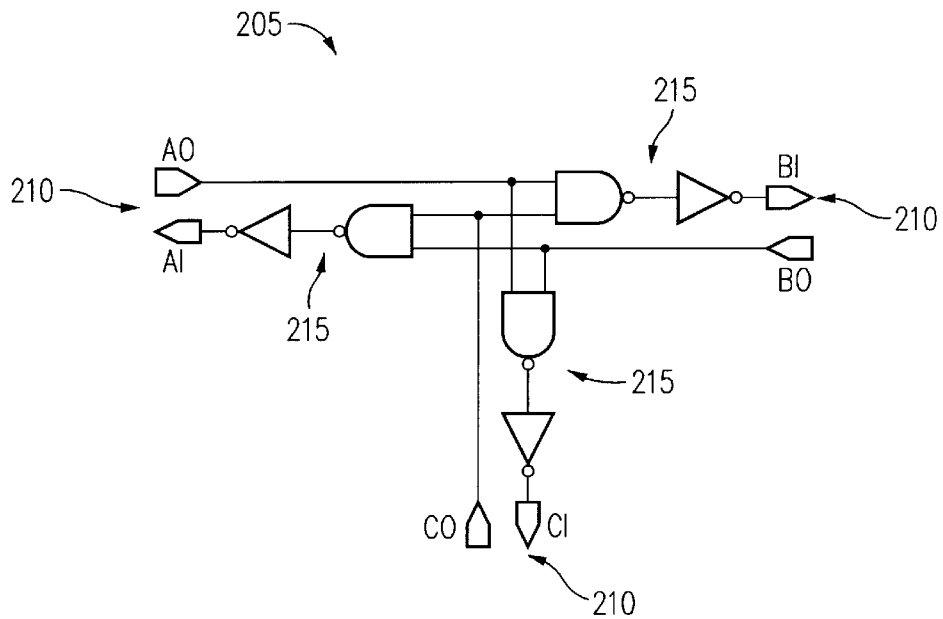
FIGS. 3A and 3B show the junction circuit (FIG. 3A) and driver circuit (FIG. 3B) included in a first embodiment of the present invention.
Figure 3B:
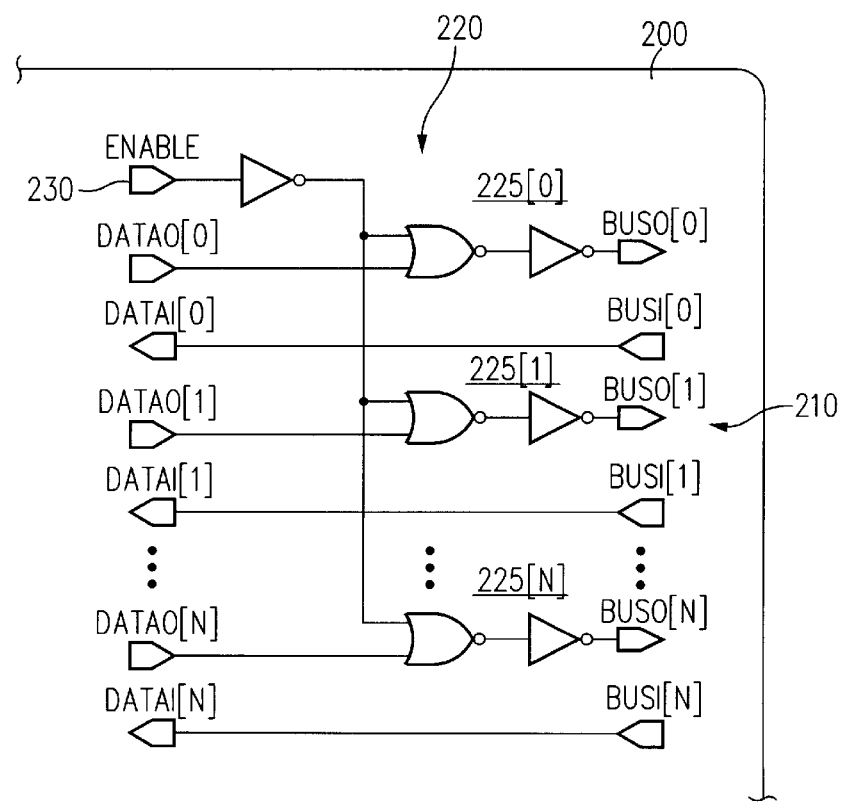

A first embodiment of the present invention is described in greater detail in FIGS. 3A and 3B. In FIG. 3A, the junction circuit 205 is described, and for simplicity, only one pair of data wires of the bi-directional bus segment 210 is shown (a one bit slice of the junction circuit 205 for this figure and all following figures illustrating embodiments of the junction circuit 205), however, the junction circuit 205 shown is replicated for each line of the bi-directional bus segments 210. In this first embodiment, the junction circuit 205 includes at least three logical AND gates 215 (or, alternatively, a logical NAND gate with an inverter as illustrated) wherein the output signal to each bi-directional bus segment 210 coupled to the junction circuit 205 is the logical AND of the input signals from all the other bi-directional bus segments 210 coupled to the junction circuit 205. For example, the output CI to the- directional bus segment 210 from the junction circuit 205 is the logical AND of bi-directional bus segment 210 outputs AO and BO, the output BI to the bi-directional bus segment 210 is the logical AND of bi-directional bus segment 210 outputs AO and CO, and the output AI to the bi-directional bus segment 210 is the logical AND of bi-directional bus segment 210 outputs BO and CO. The idle state input signals to the junction circuit 205 are high (logic 1) and each input signal to the junction circuit 205 is in an idle state or a non-idle state. The output signal to each bi-directional bus segment 210 coupled to the junction circuit 205 is equal to the input signal not being driven into the idle state.

In combination with the junction circuit 205 of the first embodiment, each logic block 200 further includes a driver circuit 220 (illustrated in FIG. 3B) for providing output signals BUSO[0], BUSO[1], . . . BUSO[N] to the bi-directional bus segment 210 coupled to the logic block 200. The bi-directional bus segment 210 coupled to the logic block 200 directly provides input signals BUSI[0], BUSI[1], . . . BUSI[N] to the logic block 200 as data input signals DATAI[0], DATAI[1], . . . DATAI[N]. In the first embodiment of the present invention, the driver circuit 220 comprises a logical OR gate 225[0], 225[1], . . . 225[N] (illustrated as a logical NOR gate with an inverter) for each data wire of the bi-directional bus segment 210 which outputs a signal from the logic block 200. The output signals BUSO[0], BUSO[1], . . . BUSO[N] of the driver circuit 220 is the logical OR of an inverted enable signal 230 and a corresponding logic block 200 output signal DATAO[0], DATAO[1], . . . DATAO[N]. The output signals BUSO[0], BUSO[1], . . . BUSO[N] of the driver circuit 220 are the input signals to the junction circuit 205 coupled to the logic block 200 through the bi-directional bus segment 210.

The driver circuit 220 has an active high enable. For example, the enable signal 230 is a logic 0, which is then inverted to a logic 1 when not driving the bi-directional bus segment 210 output which provides an idle state input signal (of high or logic 1) to the junction circuit 205 coupled to the logic block 200. When the logic block 200 is not driving the bi-directional bus segment 210, a logic 1 is output on that bi-directional bus segment 210. Referring to the junction circuit 205 illustrated in FIG. 3A, if, for instance, AO is a logic 1 (idle state) then the logical AND of AO and CO, which would be output as BI, is the value of CO. However, if the enable signal 230 is a logic 1, which is then inverted to a logic 0, then the corresponding logic block 200 output signal DATAO[0], DATAO[1], . . . DATAO[N] is propagated through the logical OR gates 225[0], 225[1], . . . 225[N] of the driver circuit 220 as corresponding output signals BUSO [0], BUSO[1], . . . BUSO[N].

Figure 4A:
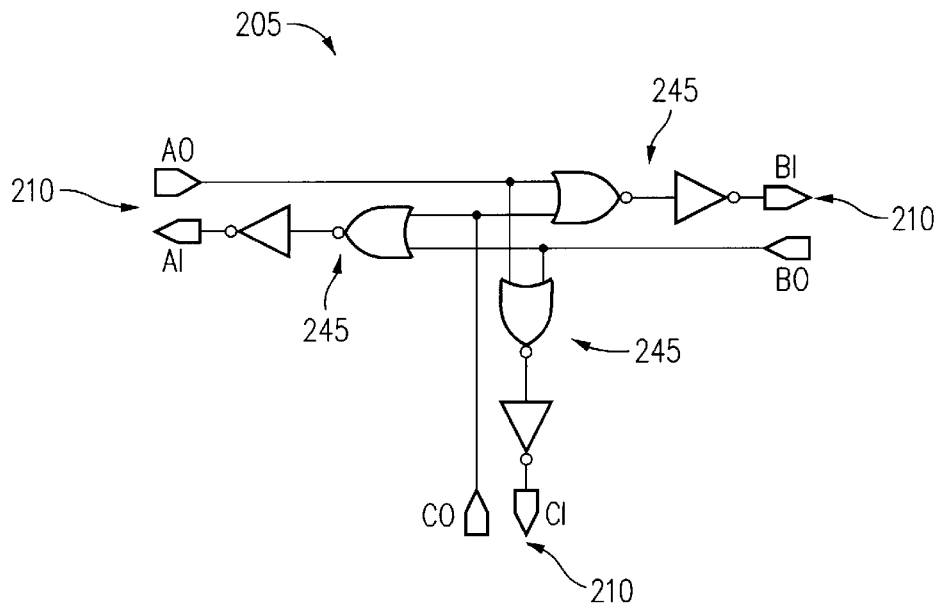
FIGS. 4A and 4B show the junction circuit (FIG. 4A) and driver circuit (FIG. 4B) included in a second embodiment of the present invention.
Figure 4B:
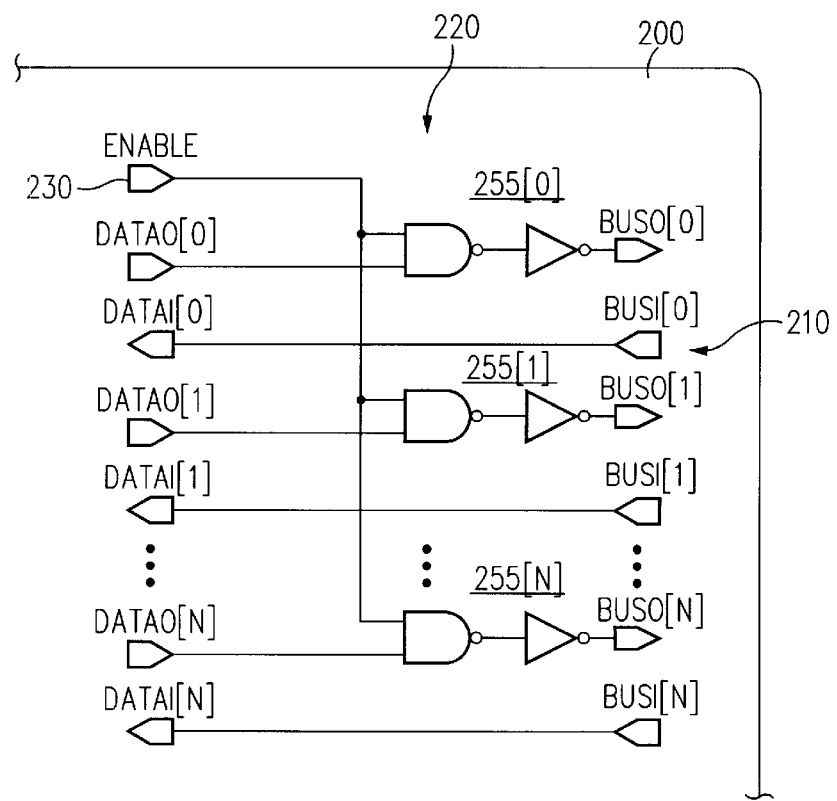

A second embodiment of the present invention is described in FIGS. 4A and 4B. In FIG. 4A, the junction circuit 205 is described, and for simplicity, only one pair of data wires of the bi-directional bus segment 210 is shown, however, the junction circuit 205 shown is replicated for each line of the bi-directional bus segments 210. In this second embodiment, the junction circuit 205 includes three logical OR gates 245 (or, alternatively, a logical NOR gate with an inverter as illustrated) wherein the output to each bi-directional bus segment 210 coupled to the junction circuit 205 is the logical OR of the inputs from all the other bi-directional bus segments 210 coupled to the junction circuit 205. For example, the output CI to the bi-directional bus segment 210 from the junction circuit 205 is the logical OR of bi-directional bus segment 210 outputs AO and BO, the output BI to the bi-directional bus segment 210 is the logical OR of bi-directional bus segment 210 outputs AO and CO, and the output AI to the bi-directional bus segment 210 is the logical OR of bi-directional bus segment 210 outputs BO and CO. The idle state input signals to the junction circuit 205 are low (logic 0) and each input signal to the junction circuit 205 is in an idle state or a non-idle state. The output signal to each bi-directional bus segment 210 coupled to the junction circuit 205 is equal to the input signal not being driven into the idle state.

In combination with the junction circuit 205 of the second embodiment, each logic block 200 further includes a driver circuit 220 (illustrated in FIG. 4B) for providing output signals BUSO[0], BUSO[1], . . . BUSO[N] to the bi-directional bus segment 210 coupled to the logic block 200. The bi-directional bus segment 210 coupled to the logic block 200 directly provides input signals BUSI[0], BUSI[1], . . . BUSI[N] to the logic block 200 as data input signals DATAI[0], DATAI[1], . . . DATAI[N]. In the second embodiment of the present invention, the driver circuit 220 comprises a logical AND gate 255[0], 255[1], . . . 255[N] (illustrated as a logical NAND gate with an inverter) for each data wire of the bi-directional bus segment 210 which outputs a signal from the logic block 200. The output signals BUSO[0], BUSO[1], . . . BUSO[N] of the driver circuit 220 is the logical AND of an enable signal 230 and a corresponding logic block 200 output signal DATAO[0], DATAO [1], . . . DATAO[N]. The output signals BUSO[0], BUSO[1], . . . BUSO[N] of the driver circuit 220 are the input signals to the junction circuit 205 coupled to the logic block 200 through the bi-directional bus segment 210.

The driver circuit 220 has an active high enable. For instance, the enable signal 230 is a logic 0 when not driving the bi-directional bus segment 210 output which provides an idle state input signal (of low or logic 0) to the junction circuit 205 coupled to the logic block 200. When the logic block 200 is not driving the bi-directional bus segment 210, a logic 0 is output on that bi-directional bus segment 210. Referring to the junction circuit 205 illustrated in FIG. 4A, if, for instance, AO is a logic 0 (idle state) then the logical OR of AO and CO, which would be output as BI, is the value of CO. However, if the enable signal 230 is a logic 1, then the corresponding logic block 200 output signal DATAO[0], DATAO[1], . . . DATAO[N] is propagated through the logical AND gates 255[0], 255[1], . . . 255[N] of the driver circuit 220 as corresponding output logic signals BUSO[0], BUSO[1], . . . BUSO[N].

In the third embodiment (FIGS. 5A through 5D) and fourth embodiment (FIGS. 6A through 6D) of the present invention, at least one junction circuit is an inverted input junction circuit and at least one junction circuit is an inverted output junction circuit. The inverted input junction circuits and inverted output junction circuits are alternated when the junction circuits are coupled together, for example, the inverted output junction circuit provides input signals to the inverted input junction circuit or, alternatively, the inverted input junction circuit provides input signals to the inverted output junction circuit.

Figure 5A:
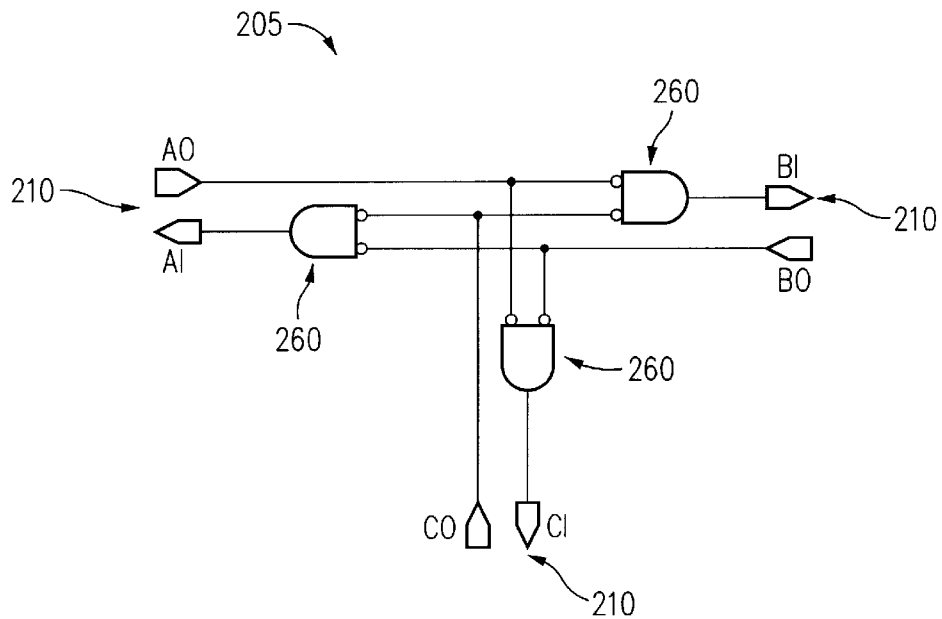
FIGS. 5A, 5B, 5C and 5D show the junction circuits (FIGS. 5A and 5C) and driver circuits (FIGS. 5B and 5D) included in a third embodiment of the present invention.
Figure 5B:
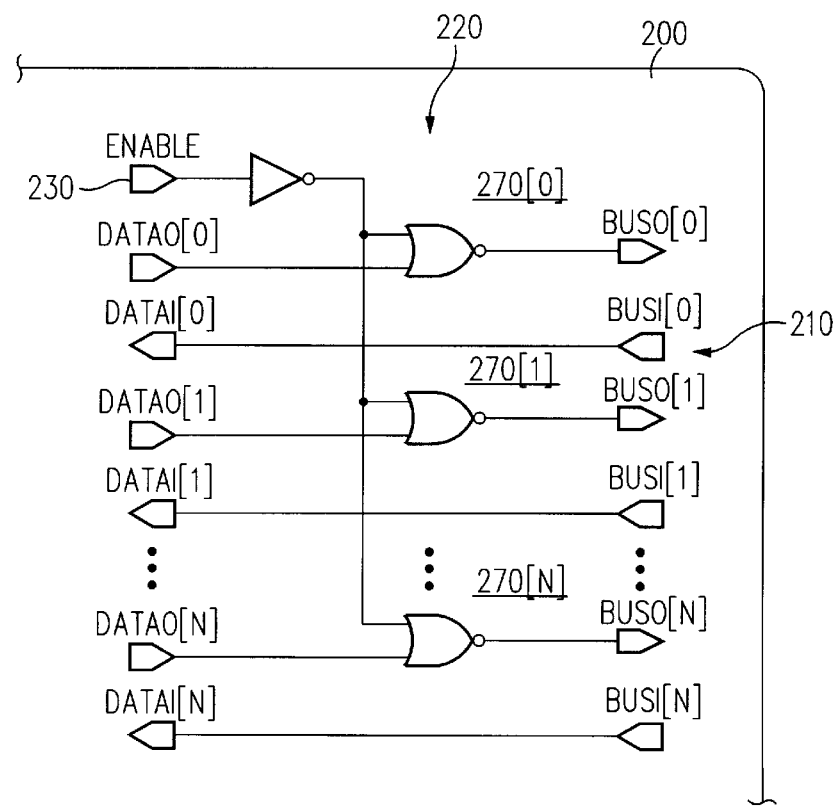

For example, in the third embodiment, each inverted input junction circuit 205, shown in a one bit slice in FIG. 5A, includes at least three logical NOR gates 260 (illustrated in FIG. 5A as a logical AND gate with inverted input signals) wherein the output to each bi-directional bus segment 210 coupled to each inverted input junction circuit 205 is the logical NOR of the inputs from all the other bi-directional bus segments 210 coupled to the inverted input junction circuit 205. For example, the output CI to bi-directional bus segment 210 is the logical NOR of bi-directional bus segment 210 outputs AO and BO. The idle state input signals to the inverted input junction circuit 205 are low (logic 0) and each input signal to the inverted input junction circuit 205 is in an idle state or a non-idle state. The output signal to each bi-directional bus segment 210 coupled to the inverted input junction circuit 205 is equal to the complement of the input signal that is not being driven into the idle state.

Each inverted output junction circuit 205 of the third embodiment (shown in FIG. 5C) includes at least three logical NAND gates 265 wherein the output to each bi-directional bus segment 210 coupled to each inverted output junction circuit 205 is the logical NAND of the inputs from all the other bi-directional bus segments 210 coupled to the inverted output junction circuit 205. For example, the output FI to bi-directional bus segment 210 is the logical NAND of bi-directional bus segment 210 outputs DO and EO. The idle state input signals to the inverted output junction circuit 205 are high (logic 1) and each input signal to the inverted output junction circuit 205 is in an idle state or a non-idle state. As in the inverted input junction circuit 205 (FIG. 5A) the output signal to each bi-directional bus segment 210 coupled to the inverted output junction circuit 205 is equal to the complement of the input signal that is not being driven into the idle state.

Figure 5C:
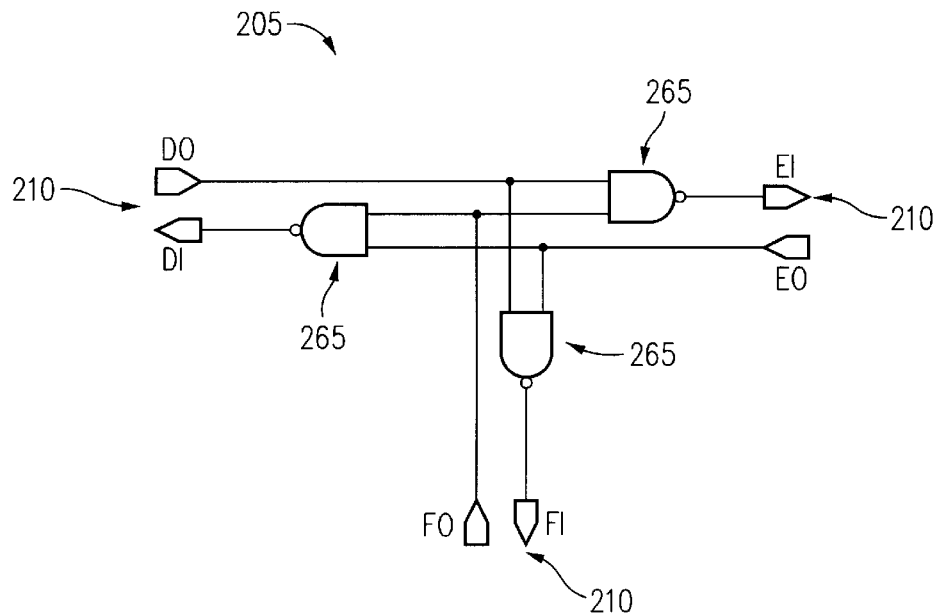
Figure 5D:
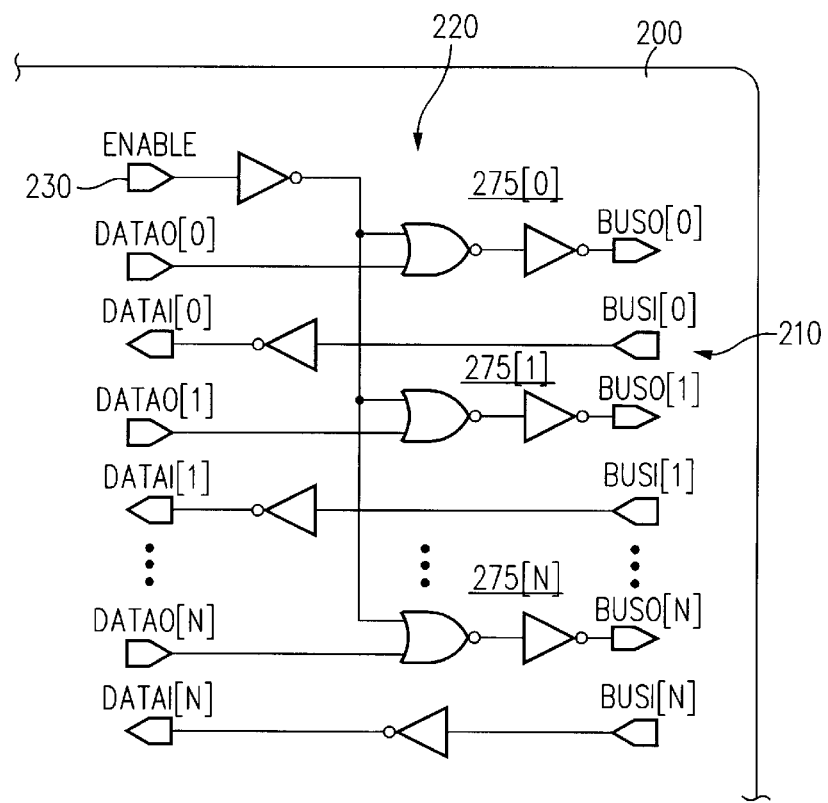

The inverted input junction circuits 205 (FIG. 5A) and inverted output junction circuits 205 (FIG. 5C) are alternated when the junction circuits 205 are coupled together. For example, the output signals (DI, EI and FI) to the bi-directional bus segments 210 from the inverted output junction circuit 205 (FIG. 5C) provide input signals (AO, BO and CO) from the bi-directional bus segments 210 to the inverted input junction circuit 205 (FIG. 5A) or, alternatively, the output signals (AI, BI and CI) to the bi-directional bus segments 210 from the inverted input junction circuit 205 (FIG. 5A) provide input signals (DO, EO and FO) from the bi-directional bus segments 210 to the inverted output junction circuit 205 (FIG. 5C).

Each logic block 200 coupled to the inverted input junction circuit 205 (FIG. 5A) includes an inverted output driver circuit 220 (illustrated in FIG. 5B) for providing output signals BUSO[0], BUSO[1], . . . BUSO[N] to the bi-directional bus segment 210 coupled to the logic block 200. The bi-directional bus segment 210 coupled to the logic block 200 directly provides input signals BUSI[0], BUSI[1], . . . BUSI[N] to the logic block 200 as data input signals DATAI[0], DATAI[1], . . . DATAI[N]. The inverted output driver circuit 220 (FIG. 5B) comprises at least one logical NOR gate 270[0], 270[1], . . . 270[N] for each data wire of the bi-directional bus segment 210 which outputs a signal from the logic block 200. The output signals BUSO[0], BUSO[1], . . . BUSO[N] of the inverted output driver circuit 220 (FIG. 5B) is the logical NOR of an inverted enable signal 230 and a corresponding logic block 200 output signal DATAO[0], DATAO[1], . . . DATAO[N]. The output signals BUSO[0], BUSO[1], . . . BUSO[N] of the inverted output driver circuit 220 are the input signals to the inverted input junction circuit 205 (FIG. 5A) coupled to the logic block 200 through the bi-directional bus segment 210. When the enable signal 230 is high (a logic 1), the output signals BUSO[0], BUSO[1], . . . BUSO[N] of the inverted output driver circuit 220 are equal to the inverted corresponding logic block 200 output signals DATAO[0], DATAO[1], . . . DATAO[N].

The inverted output driver circuit 220 (FIG. 5B) has an active high enable. For example, the enable signal 230 is a logic 0, which is then inverted to a logic 1 when not driving the bi-directional bus segment 210 output which provides an idle state input signal (of low or logic 0) to the inverted input junction circuit 205 (FIG. 5A) coupled to the logic block 200. When the logic block 200 is not driving the bi-directional bus segment 210, a logic 0 is output on that bi-directional bus segment 210. Referring to the inverted input junction circuit 205 illustrated in FIG. 5A, if, for instance, AO is a logic 0 (idle state) then the logical NOR of AO and CO, which would be output as BI, is the inverted value of CO. However, if the enable signal 230 is a logic 1, which is then inverted to a logic 0, then the corresponding logic block 200 output signal DATAO[0], DATAO[1], . . . DATAO[N] is inverted and propagated through the logical NOR gates 270[0], 270[1], . . . 270[N] of the inverted output driver circuit 220 as corresponding output signals BUSO[0], BUSO[1], . . . BUSO[N].

Each logic block 200 coupled to the inverted output junction circuit 205 (FIG. 5C) includes an inverted input driver circuit 220 (illustrated in FIG. 5D) for providing output signals BUSO[0], BUSO[1], . . . BUSO[N] to the bi-directional bus segment 210 coupled to the logic block 200. The inverted input driver circuit 220 (FIG. 5D) comprises at least one logical OR gate 275[0], 275[1], . . . 275[N] (illustrated as a NOR gate with an inverter) for each data wire of the bidirtional bus segment 210 which outputs a signal from the logic block 200. The output signals BUSO[0], BUSO[1], . . . BUSO[N] of the inverted input driver circuit 220 (FIG. 5D) are the logical OR of an inverted enable signal 230 and a corresponding logic block 200 output signal DATAO[0], DATAO[1], . . . DATAO[N]. The output signals BUSO[0], BUSO[1], . . . BUSO[N] of the inverted input driver circuit 220 are the input signals to the inverted output junction circuit 205 (FIG. 5C) coupled to the logic block 200 through the bi-directional bus segment 210. When the enable signal 230 is high (a logic 1), the output signals BUSO[0], BUSO[1], . . . BUSO[N] of the inverted output driver circuit 220 are equal to the corresponding logic block 200 output signals DATAO[0], DATAO[1], . . . DATAO[N].

The inverted input driver circuit 220 (FIG. 5D) has an active high enable. For example, the enable signal 230 is a logic 0, which is then inverted to a logic 1 when not driving the bi-directional bus segment 210 output which provides an idle state input signal (of high or logic 1) to the inverted output junction circuit 205 (FIG. 5C) coupled to the logic block 200. When the logic block 200 is not driving the bi-directional bus segment 210, a logic 1 is output on that bi-directional bus segment 210. Referring to the inverted output junction circuit 205 illustrated in FIG. 5C, if, for instance, DO is a logic 1 (idle state) then the logical NAND of DO and FO, which would be output as EI, is the inverted value of FO. However, if the enable signal 230 is a logic 1, which is then inverted to a logic 0, then the corresponding logic block 200 output signal DATAO[0], DATAO[1], . . . DATAO[N] is propagated through the logical OR gates 275[0], 275[1], . . . 275[N] of the inverted input driver circuit 220 as corresponding output signals BUSO[0], BUSO[1], . . . BUSO[N]. The bi-directional bus segment 210 coupled to the logic block 200 provides input signals BUSI[0], BUSI[1], . . . BUSI[N] to the logic block 200 which are inverted to data input signals DATAI[0], DATAI[1], . . . DATAI[N].

Figure 6A:
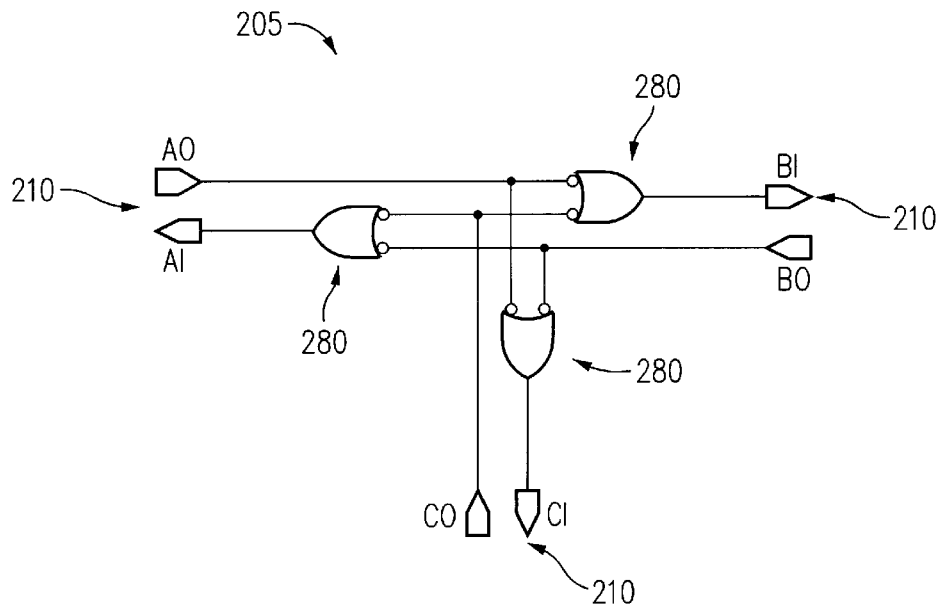
FIGS. 6A, 6B, 6C and 6D show the junction circuits (FIGS. 6A and 6C) and driver circuits (FIGS. 6B and 6D) included in a fourth embodiment of the present invention. The use of the same reference symbols in different drawings indicates similar or identical items.
Figure 6B:
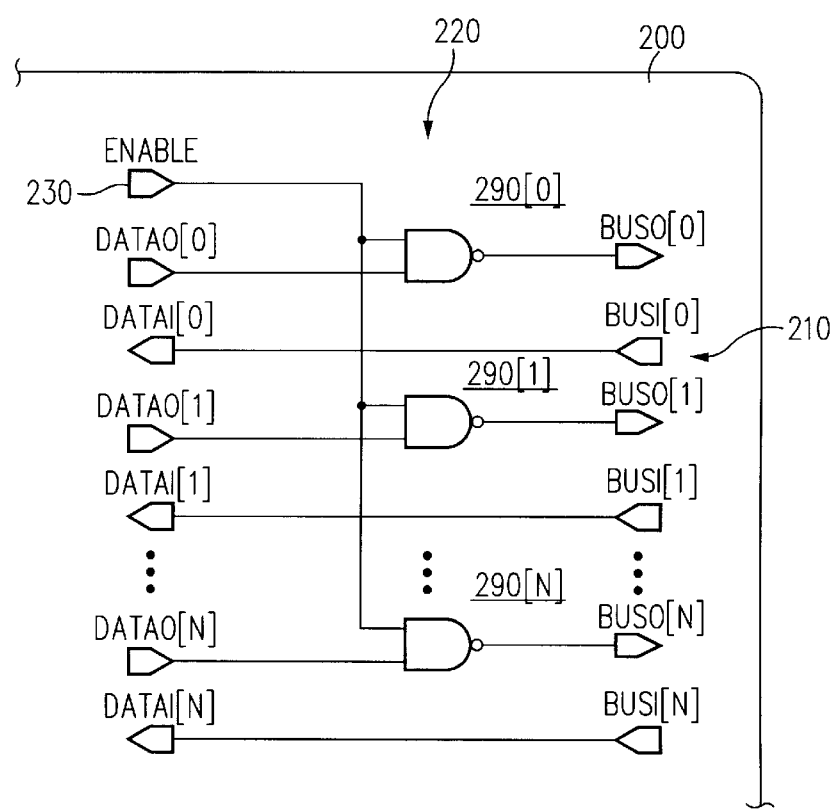

In the fourth embodiment (FIGS. 6A through 6D), each inverted input junction circuit 205, shown in a one bit slice in FIG. 6A, includes at least three logical NAND gates 280 (illustrated in FIG. 6A as a logical OR gate with inverted input signals) wherein the output to each bi-directional bus segment 210 coupled to each inverted input junction circuit 205 is the logical NAND of the inputs from all the other bi-directional bus segments 210 coupled to the inverted input junction circuit 205. For example, the output CI to bi-directional bus segment 210 is the logical NAND of bi-directional bus segment 210 outputs AO and BO. The idle state input signals to the inverted input junction circuit 205 are high (logic 1) and each input signal to the inverted input junction circuit 205 is in an idle state or a non-idle state. The output signal to each bi-directional bus segment 210 coupled to the inverted input junction circuit 205 is equal to the complement of the input signal that is not being driven into the idle state.

Each inverted output junction circuit 205 of the fourth embodiment (shown in FIG. 6C) includes at least three logical NOR gates 285 wherein the output to each bi-directional bus segment 210 coupled to each inverted output junction circuit 205 is the logical NOR of the inputs from all the other bi-directional bus segments 210 coupled to the inverted output junction circuit 205. For example, the output FI to bi-directional bus segment 210 is the logical NOR of bi-directional bus segment 210 outputs DO and EO. The idle state input signals to the inverted output junction circuit 205 are low (logic 0) and each input signal to the inverted output junction circuit 205 is in an idle state or a non-idle state. As in the inverted input junction circuit 205 (FIG. 6A) the output signal to each bi-directional bus segment 210 coupled to the inverted output junction circuit 205 is equal to the complement of the input signal that is not being driven into the idle state.

Figure 6C:
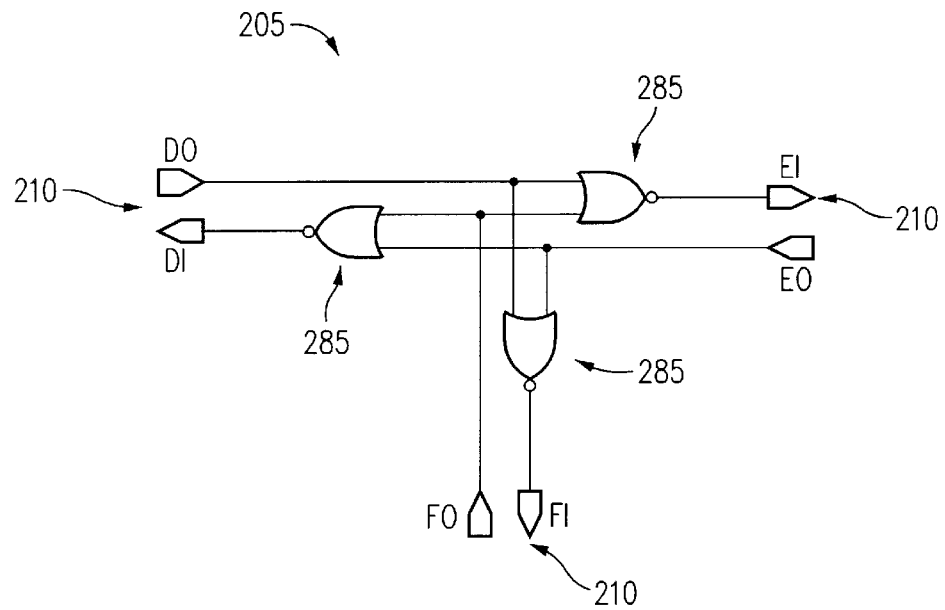
Figure 6D:
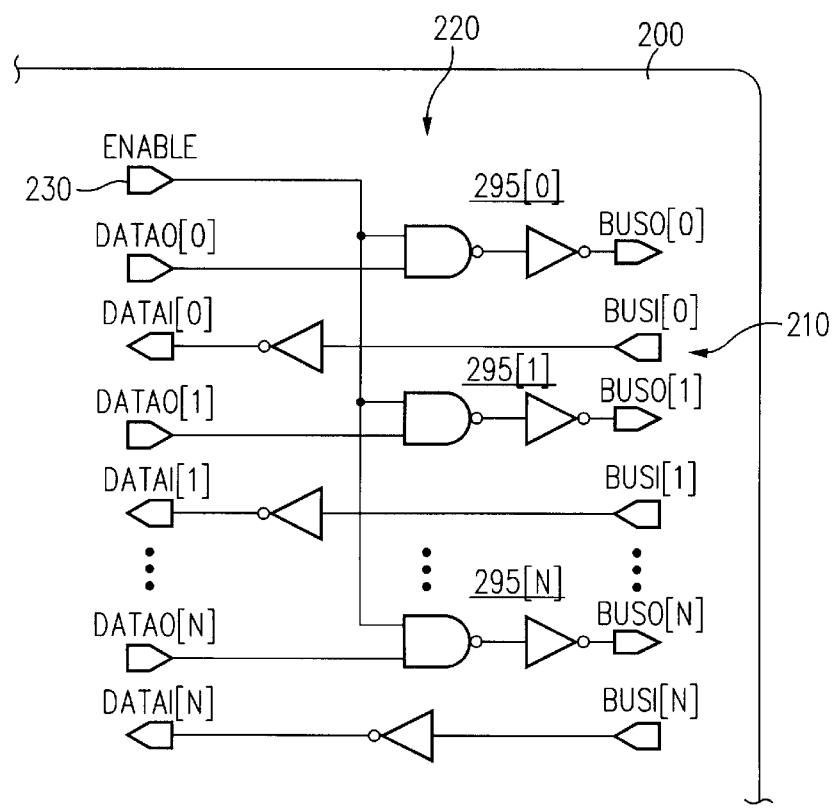

The inverted input junction circuits 205 (FIG. 6A) and inverted output junction circuits 205 (FIG. 6C) are alternated when the junction circuits 205 are coupled together. For example, the output signals (DI, EI and FI) to the bi-directional bus segments 210 from the inverted output junction circuit 205 (FIG. 6C) provide input signals (AO, BO and CO) from the bi-directional bus segments 210 to the inverted input junction circuit 205 (FIG. 6A) or, alternatively, the output signals (AI, BI and CI) to the bi-directional bus segments 210 from the inverted input junction circuit 205 (FIG. 6A) provide input signals (DO, EO and FO) from the bi-directional bus segments 210 to the inverted output junction circuit 205 (FIG. 6C).

Each logic block 200 coupled to the inverted input junction circuit 205 (FIG. 6A) includes an inverted output driver circuit 220 (illustrated in FIG. 6B) for providing output signals BUSO[0], BUSO[1], . . . BUSO[N] to the bi-directional bus segment 210 coupled to the logic block 200. The bi-directional bus segment 210 coupled to the logic block 200 directly provides input signals BUSI[0], BUSI[1], . . . BUSI[N] to the logic block 200 as data input signals DATAI[0], DATAI[1], . . . DATAI[N]. The inverted output driver circuit 220 (FIG. 6B) comprises at least one logical NAND gate 290[0], 290[1], . . . 290[N] for each data wire of the bi-directional bus segment 210 which outputs a signal from the logic block 200. The output signals BUSO[0], BUSO[1], . . . BUSO[N] of the inverted output driver circuit 220 (FIG. 6B) is the logical NAND of an enable signal 230 and a corresponding logic block 200 output signal DATAO[0], DATAO[1], . . . DATAO[N]. The output signals BUSO[0], BUSO[1], . . . BUSO[N] of the inverted output driver circuit 220 are the input signals to the inverted input junction circuit 205 (FIG. 6A) coupled to the logic block 200 through the bi-directional bus segment 210. When the enable signal 230 is high (a logic 1), the output signals BUSO[0], BUSO[1], . . . BUSO[N] of the inverted output driver circuit 220 and are equal to the inverted corresponding logic block 200 output signals DATAO[0], DATAO[1], . . . DATAO[N].

The inverted output driver circuit 220 (FIG. 6B) has an active high enable. For example, the enable signal 230 is a logic 0 when not driving the bi-directional bus segment 210 output which provides an idle state input signal (of high or logic 1) to the inverted input junction circuit 205 (FIG. 6A) coupled to the logic block 200. When the logic block 200 is not driving the bi-directional bus segment 210, a logic 1 is output on that bi-directional bus segment 210. Referring to the inverted input junction circuit 205 illustrated in FIG. 6A, if, for instance, AO is a logic 1 (idle state) then the logical NAND of AO and CO, which would be output as BI, is the inverted value of CO. However, if the enable signal 230 is a logic 1, then the corresponding logic block 200 output signal DATAO[0], DATAO[1], . . . DATAO[N] is inverted and propagated through the logical NAND gates 290[0], 290[1], . . . 290[N] of the inverted output driver circuit 220 as corresponding output signals BUSO[0], BUSO[1], . . . BUSO[N].

Each logic block 200 coupled to the inverted output junction circuit 205 (FIG. 6C) includes an inverted input driver circuit 220 (illustrated in FIG. 6D) for providing output signals BUSO[0], BUSO[1], . . . BUSO[N] to the bi-directional bus segment 210 coupled to the logic block 200. The inverted input driver circuit 220 (FIG. 6D) comprises at least one logical AND gate 295[0], 295[1], . . . 295[N] (illustrated as a NAND gate with an inverter in FIG. 6D) for each data wire of the bi-directional bus segment 210 which outputs a signal from the logic block 200. The output signals BUSO[0], BUSO[1], . . . BUSO[N] of the inverted input driver circuit 220 (FIG. 6D) are the logical AND of an enable signal 230 and a corresponding logic block 200 output signal DATAO[0], DATAO[1], . . . DATAO[N]. The output signals BUSO[0], BUSO[1], . . . BUSO[N] of the inverted input driver circuit 220 are the input signals to the inverted output junction circuit 205 (FIG. 6C) coupled to the logic block 200 through the bi-directional bus segment 210. When the enable signal 230 is high (a logic 1), the output signals BUSO[0], BUSO[1], . . . BUSO[N] of the inverted output driver circuit 220 are equal to the corresponding logic block 200 output signals DATAO[0], DATAO[1], . . . DATAO[N].

The inverted input driver circuit 220 (FIG. 6D) has an active high enable. For example, the enable signal 230 is a logic 0 when not driving the bi-directional bus segment 210 output which provides an idle state input signal (of low or logic 0) to the inverted output junction circuit 205 (FIG. 6C) coupled to the logic block 200. When the logic block 200 is not driving the bi-directional bus segment 210, a logic 0 is output on that bi-directional bus segment 210. Referring to the inverted output junction circuit 205 illustrated in FIG. 6C, if, for instance, DO is a logic 0 (idle state) then the logical NOR of DO and FO, which would be output as EI, is the inverted value of FO. However, if the enable signal 230 is a logic 1, then the corresponding logic block 200 output signal DATAO[0], DATAO[1], . . . DATAO[N] is propagated through the logical AND gates 295[0], 295[1], . . . 295[N] of the inverted input driver circuit 220 as corresponding output signals BUSO[0], BUSO[1], . . . BUSO[N]. The bi-directional bus segment 210 coupled to the logic block 200 provides input signals BUSI[0], BUSI[1], . . . BUSI[N] to the logic block 200 which are inverted to data input signals DATAI[0], DATAI[1], . . . DATAI[N].

The two-state bi-directional data bus system of the present invention provides the functioning and benefits of a standard three-state data bus at a relatively greater speed without the inherent three-state problems of bus contention because the bi-directional data bus system uses two-state logic only. Because of bus contention and floating problems inherent in three-state devices, design scan testing of three-state data buses usually requires the use of decoders which causes delays. The three-state bus device drives every logic block over the same wire causing heavy loads on the buses also. The two-state bi-directional data bus system of the present invention is relatively easily scan tested without the need for decoders. Also the drivers of the two-state bi-directional data bus system are able to drive with relatively lower loads resulting from the use of the junction circuits which effectively "breaks-up" the bi-directional data bus system.

While the invention has been described with reference to various embodiments, it will be understood that these embodiments are illustrative and that the scope of the invention is not limited to them. Many variations, modifications, additions and improvements of the embodiments described are possible. For example, the disclosed method and design may be used on any type of electronic equipment using logic elements where data transfer is desirable.

What is claimed is:

1. A circuit apparatus, including a bi-directional bus system, comprising:
   a plurality of logic blocks wherein each logic block includes circuitry for transmitting and receiving data signals and a driver circuit for selectively driving an idle state or data signals as output signals;
   one or more junction circuits;
   a plurality of bi-directional bus segments for conducting data signals thereon, wherein each bi-directional bus segment couples a logic block or a junction circuit to another junction circuit and wherein the bi-directional bus segment coupled to each logic block directly provides input signals to the logic block and the driver circuit provides output signals to the bi-directional bus segment coupled to the logic block; and
   wherein each junction circuit produces an output signal to each bi-directional bus segment coupled to the junction circuit, wherein the output signal is a function of input signals provided by all the other bi-directional bus segments coupled to the junction circuit; and
   wherein the output signal is controlled by a single input signal not being driven into the idle state when all other input signals are driven into the idle state; and
   wherein the output signal is in the idle state when all input signals are in the idle state.

2. A circuit apparatus, as recited in claim 1, wherein the idle state input signals to each junction circuit are high (logic 1) and each junction circuit includes at least three logical AND gates wherein the output signal to each bi-directional bus segment coupled to the junction circuit is the logical AND of the input signals from all the other bi-directional bus segments coupled to the junction circuit and is equal to the input signal not being driven into the idle state.

3. A circuit apparatus, as recited in claim 2, wherein the driver circuit includes at least one logical OR gate wherein the output signals of the driver circuit are the logical OR of an inverted enable signal and corresponding logic block output signals and wherein, when the enable signal is high, the output signals of the driver circuit are equal to the corresponding logic block output signals and, when the enable signal is low, the output signals of the driver circuit are in the idle state.

4. A circuit apparatus, as recited in claim 2, wherein the logical AND gates of the junction circuit are logical NAND gates with inverters.

5. A circuit apparatus, as recited in claim 3, wherein the logical OR gate of the driver circuit is logical NOR gate with an inverter.

6. A circuit apparatus, as recited in claim 1, wherein the idle state input signals to each junction circuit are low (logic 0) and each junction circuit includes at least three logical OR gates wherein the output signals to each bi-directional bus segment coupled to the junction circuit is the logical OR of the input signals from all the other bi-directional bus segments coupled to the junction circuit and is equal to the input signal not being driven into the idle state.

7. A circuit apparatus, as recited in claim 6, wherein the driver circuit includes at least one logical AND gate wherein the output signals of the driver circuit are the logical AND of an enable signal and corresponding logic block output signals and wherein, when the enable signal is high, the output signals of the driver circuit are equal to the corresponding logic block output signals and, when the enable signal is low, the output signals of the driver circuit are in the idle state.

8. A circuit apparatus, as recited in claim 6, wherein the logical OR gates of the junction circuit are logical NOR gates with inverters.

9. A circuit apparatus, as recited in claim 7, wherein the logical AND gate of the driver circuit is a logical NAND gate with an inverter.

10. A circuit apparatus, as recited in claim 1, wherein at least one junction circuit is an inverted input junction circuit and at least one junction circuit is an inverted output junction circuit and wherein, when the junction circuits are coupled together, the inverted output junction circuit provides input signals to the inverted input junction circuit or, alternatively, the inverted input junction circuit provides input signals to the inverted output junction circuit.

11. A circuit apparatus, as recited in claim 10, wherein:
   the idle state input signals to each inverted input junction circuit are low (logic 0) and each inverted input junction circuit includes at least three logical NOR gates wherein the output to each bi-directional bus segment coupled to each inverted input junction circuit is the logical NOR of the inputs from all the other bi-directional bus segments coupled to the inverted input junction circuit and is equal to the complement of the input signal not being driven into the idle state; and
   the idle state input signals to each inverted output junction circuit are high (logic 1) and each inverted output junction circuit includes at least three logical NAND gates wherein the output to each bi-directional bus segment coupled to each inverted output junction circuit is the logical NAND of the inputs from all the other bi-directional bus segments coupled to the inverted output junction circuit and is equal to the complement of the input signal not being driven into the idle state.

12. A circuit apparatus, as recited in claim 11, wherein the logical NOR gates of the inverted input junction circuit are logical AND gates with inverted input signals.

13. A circuit apparatus, as recited in claim 11, wherein the logical NAND gates of the inverted output junction circuit are logical AND gates with an inverted output signal.

14. A circuit apparatus, as recited in claim 11, wherein:
the driver circuit of each logic block coupled to the inverted input junction circuit is an inverted output driver circuit and includes:
at least one logical NOR gate wherein the output signals of the inverted output driver circuit are the logical NOR of an inverted enable signal and corresponding logic block output signals and wherein, when the enable signal is high, the output signals of the inverted output driver circuit are equal to the inverted corresponding logic block output signals and, when the enable signal is low, the output signals of the inverted output driver circuit are in the idle state.

15. A circuit apparatus, as recited in claim 11, wherein:
the driver circuit of each logic block coupled to the inverted output junction circuit is an inverted input driver circuit and includes:
at least one logical OR gate wherein the output signals of the inverted input driver circuit are the logical OR of an inverted enable signal and corresponding logic block output signals and wherein, when the enable signal is high, the output signals of the inverted input driver circuit are equal to the corresponding logic block output signals and, when the enable signal is low, the output signals of the inverted output driver circuit are in the idle state; and
wherein the input signals conducted by the bi-directional bus segment to the logic block from the inverted output junction circuit are inverted.

16. A circuit apparatus, as recited in claim 15, wherein the logical OR gates of the inverted input driver circuit are logical NOR gates with inverters.

17. A circuit apparatus, as recited in claim 10, wherein:
the idle state input signals to each inverted imput junction circuit are high (logic 1) and each inverted input junction circuit includes at least three logical NAND gates wherein the output to each bi-directional bus segment coupled to each inverted input junction circuit is the logical NAND of the inputs from all the other bi-directional bus segments coupled to the inverted input junction circuit and is equal to the complement of the input signal not being driven into the idle state; and
the idle state input signals to each inverted output junction circuit are low (logic 0) and each inverted output junction circuit includes at least three logical NOR gates wherein the output to each bi-directional bus segment coupled to each inverted output junction circuit is the logical NOR of the inputs from all the other bi-directional bus segments coupled to the inverted output junction circuit and is equal to the complement of the input signal not being driven into the idle state.

18. A circuit apparatus, as recited in claim 17, wherein the logical NAND gates of the inverted input junction circuit are logical OR gates with inverted input signals.

19. A circuit apparatus, as recited in claim 17, wherein the logical NOR gates of the inverted output junction circuit are logical OR gates with an inverted output signal.

20. A circuit apparatus, as recited in claim 17, wherein:
the driver circuit of each logic block coupled to the inverted input junction circuit is an inverted output driver circuit and includes:
at least one logical NAND gate wherein the output signals of the inverted output driver circuit are the logical NAND of an enable signal and corresponding logic block output signals and wherein, when the enable signal is high, the output signals of the inverted output driver circuit are equal to the inverted corresponding logic block output signals and, when the enable signal is low, the output signals of the inverted output driver circuit are in the idle state.

21. A circuit apparatus, as recited in claim 17, wherein:
the driver circuit of each logic block coupled to the inverted output junction circuit is an inverted input driver circuit and includes:
at least one logical AND gate wherein the output signals of the inverted output driver circuit are the logical AND of an enable signal and corresponding logic block output signals and wherein, when the enable signal is high, the output signals of the inverted input driver circuit are equal to the corresponding logic block output signals and, when the enable signal is low, the output signals of the inverted input driver circuit are in the idle state; and
wherein the input signals conducted by the bi-directional bus segment to the logic block from the inverted output junction circuit are inverted.

22. A circuit apparatus, as recited in claim 21, wherein the logical AND gates of the inverted input driver circuit are logical NAND gates with inverters.

23. A circuit comprising:
a plurality of logic blocks wherein each logic block includes circuitry for transmitting and receiving data signals and a driver circuit for selectively driving an idle state or data signals as output signals;
one or more junction circuits;
a plurality of bi-directional bus segments for conducting data signals thereon, wherein each bi-directional bus segment couples a logic block or a junction circuit to another junction circuit; and
wherein each junction circuit produces an output signal to each bi-directional bus segment coupled to the junction circuit and wherein each junction circuit includes at least three logical AND gates and the output signal to each bi-directional bus segment coupled to the junction circuit is the logical AND of the input signals from all the other bi-directional bus segments coupled to the junction circuit and is equal to a single input signal not being driven into the idle state when all other input signals are driven into the idle state, and is in the idle state when all input signals are in the idle state and wherein the idle state input signals to each junction circuit are high (logic 1); and
wherein the driver circuit includes:
at least one logical OR gate wherein the output signals of the driver circuit are the logical OR of an inverted enable signal and corresponding logic block output signals and wherein, when the enable signal is high, the output signals of the driver circuit are equal to the corresponding logic block output signals and, when the enable signal is low, the output signals of the driver circuit are in the idle state; and
wherein the bi-directional bus segment coupled to each logic block directly provides input signals to the logic block.

24. A circuit, as recited in claim 23, wherein the logical AND gates of the junction circuit are logical NAND gates with inverters.

25. A circuit, as recited in claim 23, wherein the logical OR gate of the driver circuit is a logical NOR gate with an inverter.

26. A circuit comprising:

a plurality of logic blocks wherein each logic block includes circuitry for transmitting and receiving data signals and a driver circuit for selectively driving an idle state or data signals as output signals;

one or more junction circuits;

a plurality of bi-directional bus segments for conducting data signals thereon, wherein each bi-directional bus segment couples a logic block or a junction circuit to another junction circuit; and wherein each junction circuit produces an output signal to each bi-directional bus segment coupled to the junction circuit and wherein each junction circuit includes at least three logical OR gates and the output signal to each bi-directional bus segment coupled to the junction circuit is the logical OR of the input signals from all the other bi-directional bus segments coupled to the junction circuit and is equal to a single input signal not being driven into the idle state when all other input signals are driven into the idle state, and is in the idle state when all input signals are in the idle state and wherein the idle state input signals to each junction circuit are low (logic 0); and wherein the driver circuit includes:

at least one logical AND gate wherein the output signals of the driver circuit are the logical AND of an enable signal and corresponding logic block output signals and wherein, when the enable signal is high, the output signals of the driver circuit are equal to the corresponding logic block output signals and, when the enable signal is low, the output signals of the driver circuit are in the idle state; and wherein the bi-directional bus segment coupled to each logic block directly provides input signals to the logic block.

27. A circuit, as recited in claim 26, wherein the logical OR gates of the junction circuit are logical NOR gates inverters.

28. A circuit, as recited in claim 26, wherein the logical AND gate of the driver circuit is a logical NAND gate with an inverter.

29. A circuit comprising:

a plurality of logic blocks wherein each logic block includes circuitry for transmitting and receiving data signals and a driver circuit for selectively driving an idle state or data signals as output signals;

two or more junction circuits wherein at least one junction circuit is an inverted input junction circuit and at least one junction circuit is an inverted output junction circuit and wherein, when the junction circuits are coupled together, the inverted output junction circuit provides input signals to the inverted input junction circuit or, alternatively, the inverted input junction circuit provides input signals to the inverted output junction circuit;

a plurality of bi-directional bus segments for conducting data signals thereon, wherein each bi-directional bus segment couples a logic block or a junction circuit to another junction circuit; and wherein the bi-directional bus segment coupled to each logic block directly provides input signals to the logic block; and wherein each inverted input junction circuit produces an output signal to each bi-directional bus segment coupled to the inverted input junction circuit and includes at least three logical NOR gates wherein the output to each bi-directional bus segment coupled to each inverted input junction circuit is the logical NOR of the input signals from all the other bi-directional bus segments coupled to the inverted input junction circuit and is equal to the complement of an input signal not being driven into the idle state when all other input signals are driven into the idle state, and is in the idle state when all input signals are in the idle state and wherein the idle state input signals to each inverted input junction circuit are low (logic 0); and wherein each inverted output junction circuit produces an output signal to each bi-directional bus segment coupled to the inverted output junction circuit and includes at least three logical NAND gates wherein the output to each bi-directional bus segment coupled to each inverted output junction circuit is the logical NAND of the inputs from all the other bi-directional bus segments coupled to the inverted output junction circuit and is equal to the complement of an input signal not being driven into the idle state when all other input signals are driven into the idle state, and is in the idle state when all input signals are in the idle state and wherein the idle state input signals to each inverted output junction circuit are high (logic 1); and wherein the driver circuit of each logic block coupled to the inverted input junction circuit is an inverted output driver circuit and includes:

at least one logical NOR gate wherein the output signals of the inverted output driver circuit are the logical NOR of an inverted enable signal and corresponding logic block output signals and wherein, when the enable signal is high, the output signals of the inverted output driver circuit are equal to the inverted corresponding logic block output signals and, when the enable signal is low, the output signals of the inverted output driver circuit are in the idle state; and wherein the driver circuit of each logic block coupled to the inverted output junction circuit is an inverted input driver circuit and includes:

at least one logical OR gate wherein the output signals of the inverted input driver circuit are the logical OR of an inverted enable signal and corresponding logic block output signals and wherein, when the enable signal is high, the output signals of the inverted input driver circuit are equal to the corresponding logic block output signals and, when the enable signal is low, the output signals of the inverted output driver circuit are in the idle state; and wherein the input signals conducted by the bi-directional bus segment to the logic block from the inverted output junction circuit are inverted.

30. A circuit, as recited in claim 29, wherein the logical NOR gates of the inverted input junction circuit are logical AND gates with inverted input signals.

31. A circuit, as recited in claim 29, wherein the logical NAND gates of the inverted output junction circuit are logical AND gates with inverted output signals.

32. A circuit, as recited in claim 29, wherein the logical OR gate of the inverted input driver circuit is a logical NOR gate with an inverter.

33. A circuit comprising:

a plurality of logic blocks wherein each logic block includes circuitry for transmitting and receiving data signals and a driver circuit for selectively driving an idle state or data signals as output signals;

two or more junction circuits wherein at least one junction circuit is an inverted input junction circuit and at least one junction circuit is an inverted output junction circuit and wherein, when the junction circuits are coupled together, the inverted output junction circuit provides input signals to the inverted input junction circuit or, alternatively, the inverted input junction circuit provides input signals to the inverted output junction circuit;

a plurality of bi-directional bus segments for conducting data signals thereon, wherein each bi-directional bus segment couples a logic block or a junction circuit to another junction circuit; and wherein the bi-directional bus segment coupled to each logic block directly provides input signals to the logic block; and wherein each inverted input junction circuit produces an output signal to each bi-directional bus segment coupled to the inverted input junction circuit and includes at least three logical NAND gates wherein the output to each bi-directional bus segment coupled to each inverted input junction circuit is the logical NAND of the inputs from all the other bi-directional bus segments coupled to the inverted input junction circuit and is equal to the complement of an input signal not being driven into the idle state when all other input signals are driven into the idle state, and is in the idle state when all input signals are in the idle state and wherein the idle state input signals to each inverted input junction circuit are high (logic 1); and wherein each inverted output junction circuit produces an output signal to each bi-directional bus segment coupled to the inverted output junction circuit and includes at least three logical NOR gates wherein the output to each bi-directional bus segment coupled to each inverted output junction circuit is the logical NOR of the inputs from all the other bi-directional bus segments coupled to the inverted output junction circuit and is equal to the complement of an input signal not being driven into the idle state when all other input signals are driven into the idle state, and is in the idle state when all input signals are in the idle state and wherein the idle state input signals to each inverted output junction circuit are low (logic 0); and wherein the driver circuit of each logic block coupled to the inverted input junction circuit is an inverted output driver circuit and includes:

at least one logical NAND gate wherein the output signals of the inverted output driver circuit are the logical NAND of an enable signal and corresponding logic block output signals and wherein, when the enable signal is high, the output signals of the inverted output driver circuit are equal to the inverted corresponding logic block output signals and, when the enable signal is low, the output signals of the inverted output driver circuit are in the idle state; and wherein the driver circuit of each logic block coupled to the inverted output junction circuit is an inverted input driver circuit and includes:

at least one logical AND gate wherein the output signals of the inverted output driver circuit are the logical AND of an enable signal and corresponding logic block output signals and wherein, when the enable signal is high, the output signals of the inverted input driver circuit are equal to the corresponding logic block output signals and, when the enable signal is low, the output signals of the inverted input driver circuit are in the idle state; and wherein the input signals conducted by the bi-directional bus segment to the logic block from the inverted output junction circuit are inverted.

34. A circuit, as recited in claim 33, wherein the logical NAND gates of the inverted input junction circuit are logical OR gates with inverted input signals.

35. A circuit, as recited in claim 33, wherein the logical NOR gates of the inverted output junction circuit are logical OR gates with inverted output signals.

36. A circuit, as recited in claim 29, wherein the logical AND gate of the inverted input driver circuit is a logical NAND gate with an inverter.

* * * * *